United States Patent [19]

Koelle et al.

[11] Patent Number: 4,739,328
[45] Date of Patent: Apr. 19, 1988

[54] SYSTEM FOR IDENTIFYING PARTICULAR OBJECTS

[75] Inventors: Alfred R. Koelle; Jeremy A. Landt, both of Los Alamos, N. Mex.

[73] Assignee: Amtech Corporation, Santa Fe, N. Mex.

[21] Appl. No.: 885,248

[22] Filed: Jul. 14, 1986

[51] Int. Cl.[4] .............................................. G01S 13/74
[52] U.S. Cl. ......................................... 342/44; 342/51
[58] Field of Search .................................... 342/44, 51

[56] References Cited

U.S. PATENT DOCUMENTS

| | | | |
|---|---|---|---|
| 3,914,762 | 10/1975 | Klensch | 342/44 |
| 4,068,232 | 1/1978 | Meyers et al. | 342/44 |
| 4,069,472 | 1/1978 | Kamata et al. | 342/44 |
| 4,333,078 | 6/1982 | Henoch et al. | 342/44 |
| 4,345,253 | 8/1982 | Hoover | 342/44 |
| 4,358,765 | 11/1982 | Henoch et al. | 342/51 |
| 4,364,043 | 12/1982 | Cole et al. | 342/44 X |
| 4,388,524 | 6/1983 | Walton | 342/44 X |
| 4,546,241 | 10/1985 | Walton | 342/44 X |
| 4,551,725 | 11/1985 | Schaffer | 342/44 |

Primary Examiner—Thomas H. Tarcza
Assistant Examiner—John B. Sotomayor
Attorney, Agent, or Firm—Ellsworth R. Roston; Charles H. Schwartz

[57] ABSTRACT

A reader interrogates an object. The object has a tag with a data source such as a read-only memory (ROM) which produces an identifying sequence of binary 1's and 0's in an individual pattern and transmits these signals to the reader. Each "1" or "0" is converted to a plurality of signal cycles at first and second harmonic frequencies. For example, a "1" may be identified by two signal cycles at the second frequency (e.g. 40 kHz) and then one signal cycle at the first frequency (e.g. 20 kHz) and a "0" may be identified by a signal cycle at the first frequency and then two signal cycles at the second frequency. The transponder also produces a plurality of signal cycles in an individual code (different from any combination of "1's" and "0's") to indicate the end of the transmission of the signal cycles identifying the object and the start of another transmission. The reader receives the signal cycles identifying the object and delays these signal cycles by (a) a first time such as ¼ period of a cycle at the second frequency, (b) a second time such as ½ of such period and (c) a third time corresponding to such period. The reader compares the received signals and the first delayed signals to produce first phase-locked signals. The reader compares the received signals and the second delayed signals to produce additional phase-locked signals at the times that the first phase-locked signals are not produced. The reader then produces clock signals from the first and additional phase-locked signals. The reader produces information signals from a comparison of the received signals and the third delayed signals. The reader synchronizes the information signals with the lock signals to identify the object.

30 Claims, 5 Drawing Sheets

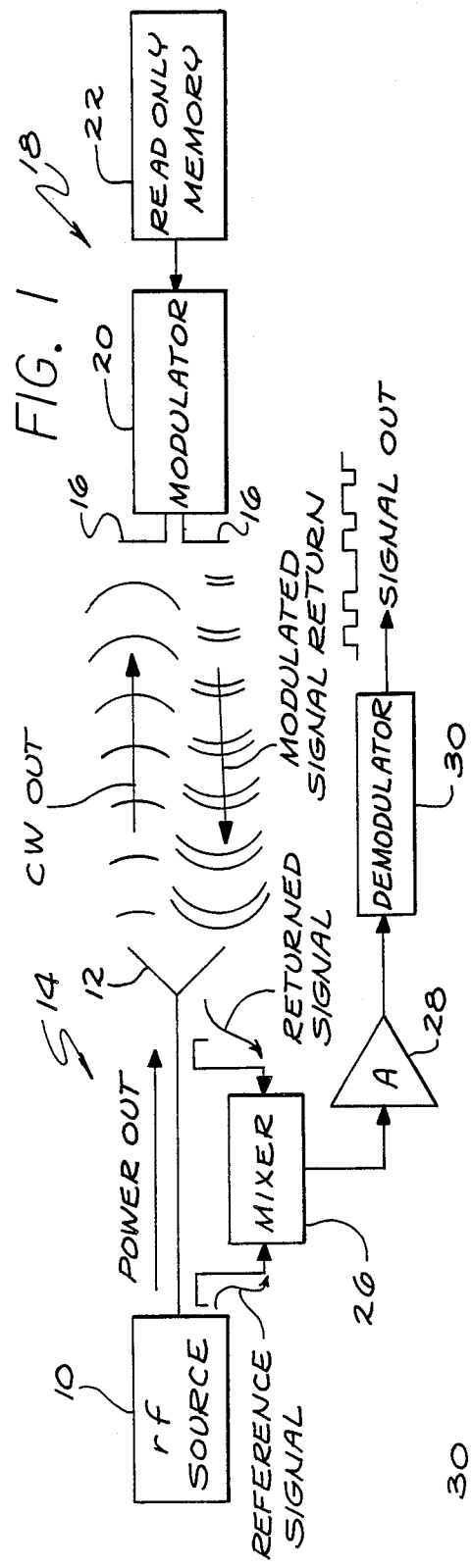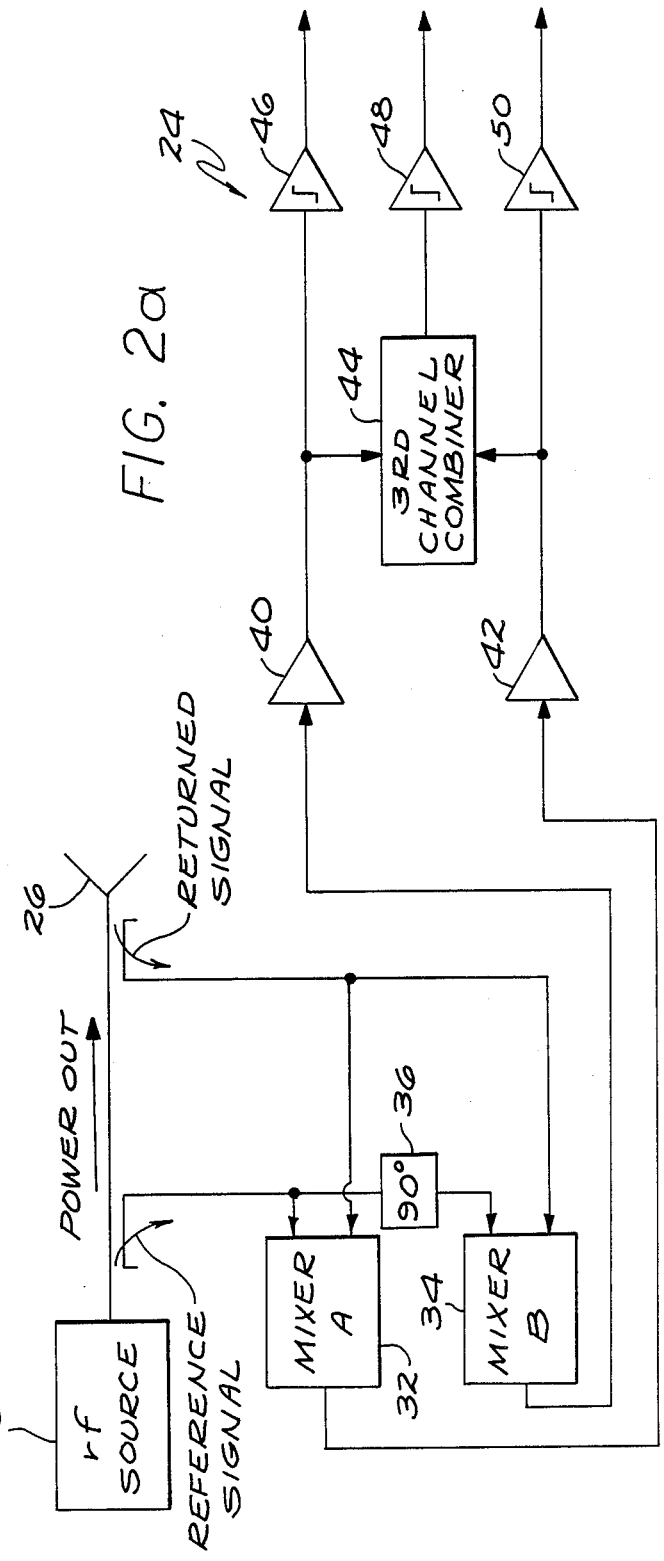

SYSTEM FOR IDENTIFYING PARTICULAR OBJECTS

This invention relates to systems for identifying objects on a remote basis. More particularly, the invention relates to a system including a reader for providing a simple and reliable identification of an object, when the object is displaced by a considerable distance from the reader, by detecting an individual sequence of signal cycles identifying the object.

As commerce becomes increasingly complex, the volume of products requiring individual identifications increases. For example, containers holding goods are stacked on merchant ships. When the merchant ships reach a destination port, only individual ones of such containers have to be unloaded and the remaining containers may be retained on the merchant ship until subsequent destination ports are reached. It would be desirable to identify, on a remote basis such as in the order of 30 to 40 feet, the containers which have to be unloaded at the destination port. By identifying such containers on a remote basis, any need for merchant seamen or longshoremen at the destination port to have to inspect such containers individually may be eliminated.

Systems have been developed for identifying an object on a remote basis. Such systems include a reader displaced from the object for interrogating a tag at the object. The tag has an identifying code which is individual to the object being interrogated. This code is representd by a sequence of binary 1's and binary 0's in a pattern individual to the object. Each of the binary 1's and binary 0's in this sequence is converted to a plurality of signal cycles which are transmitted to the reader. The signal cycles in each plurality may have first and second frequencies in a particular pattern to identify a binary "1" and may have first and second frequencies in another pattern to identify a binary "0".

The systems in use have certain difficulties. One difficulty is that the patterns of signal cycles identifying binary 1's and binary 0's are in a form which creates problems at the reader. Another problem is that the reader cannot identify easily when a transmission of the signal cycles identifying the individual sequence of binary 1's and binary signal cycles for an object has been completed. A third problem is that detection of the information represented by the patterns of signals in the binary 1's and the binary 0's has been inhibited. This inhibition has resulted partly from the inability of the reader to generate clock signal cycles on a self-synchronous basis from the signals received from the transponder. This inability of the reader to generate clock signals on a self-synchronous basis has impeded the operation of the reader in identifying the individual pattern of binary 1's and binary 0's in the sequence.

A considerable effort has been made to overcome the disadvantages discussed in the previous paragraph. In spite of such efforts, such disadvantages still exist in systems for identifying objects on a remote basis. These disadvantages have tended to limit the willingness of individuals and organizations to employ systems for identifying objects on a remote basis. It has also impeded the systems from fulfilling their theoretical ranges of operability.

This invention provides a system which overcomes the disadvantages discussed above. The system produces pluralities of cycles of signals at first and second harmonic frequencies. The cycles of the signals identifying a binary "1" are symmetrical to the signals identifying a binary "0". In other words, the cycles at the second frequency occur before a cycle at the first frequency to represent a binary "1" and the cycle at the first frequency occurs before the cycles at the second frequency to identify a binary "0".

The system of this invention is also advantageous in that it provides a code identifying the end of the transmission of signal cycles identifying an object and the start of another such transmission. This code is in a form which is distinctive from the pluralities of signal cycles identifying binary 1's and binary 0's regardless of the combinations of binary 1's and binary 0's which follow the code identifying the start of the information transmission. The code identifying the end of one transmission and the start of the next transmission is also advantageous because it occurs in a minimal time.

The system also provides a generation of clock signals on a self-synchronizing basis regardless of the patterns of binary 1's and binary 0's transmitted to the reader. This facilitates the detection by the reader on a straightforward and reliable basis of the sequence of binary 1's and binary 0's identifying the object.

The reader receives the signal cycles identifying the object and delays these signal cycles by (a) a first time such as one fourth (¼) of the period of a cycle at the second frequency, (b) a second time such as one half (½) of such period and (c) a third time such as such one (1) such period. The reader compares the received signal cycles and the first delayed signal cycles to produce first phase-locked signals for generating the clock signals. The reader compares the received signal cycles and the second delayed signal cycles to produce additional phase-locked signals at the times that the first phase-locked signals for generating the clock signals are not produced. The reader then produces clock signals from the first and additional phase-locked signals.

The reader produces information signals from a comparison of the received signal cycles and the third delayed signal cycles. The reader synchronizes the information signals with the clock signals to identify the object. By identifying the object, the object may be segregated from adjacent objects and individual operations may then be performed on such segregated object. For example, containers disposed on a merchant ship and destined for a particular port may be identified and segregated at such particular port by the system constituting this invention.

In the drawings:

FIG. 1 is a simplified block diagram of a reader and a transponder included in one embodiment of the invention for identifying at the reader an object associated with the transponder;

FIGS. 2, 2b, 2c and 2d constitute complementary block diagrams illustrating on a somewhat detailed basis the construction of the reader shown in FIG. 1;

Figure 2B:
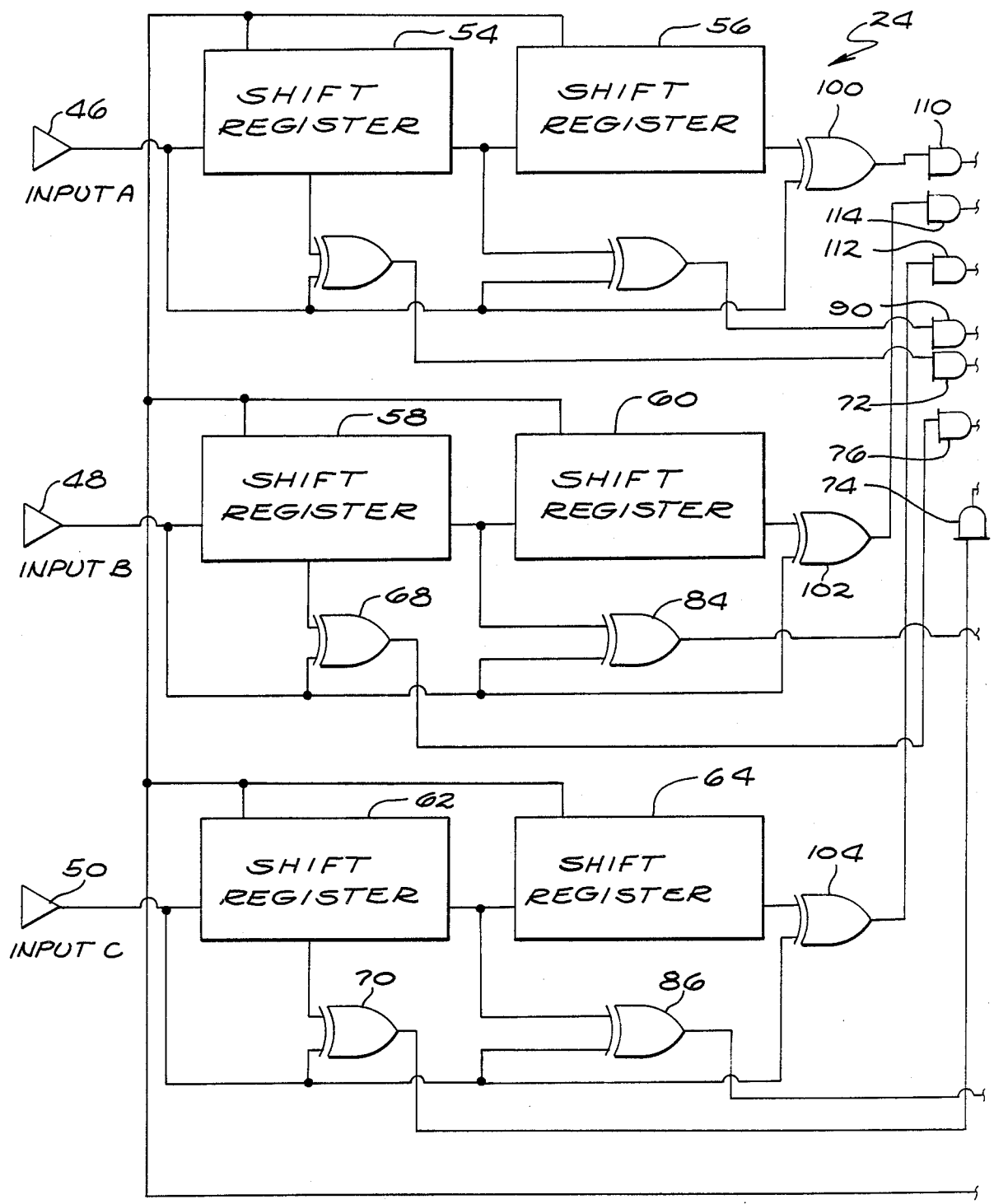

In one embodiment of the invention, a source 10 of interrogating rf signals is connected to an antenna 12 at a reader generally indicated at 14. The interrogating rf signals from the source 10 may have a suitable frequency such as nine hundred and fifteen megahertz (915 MHz). When the source 10 of interrogating rf signals is energized, the antenna 12 transmits activating signals to a suitable antenna 16 (such as a dipole antenna) at a transponder generally indicated at 18. The transponder 18 is located at an object (not shown) to identify the object. The transponder includes a data source such as a read-only memory 22 which provides a sequence of binary 1's and binary 0's in an individual pattern to identify the object.

A binary "1" in the read-only memory 22 causes a modulator 20 to produce a first plurality of signal cycles and a binary "0" in the read-only memory 22 causes the modulator 20 to produce a second plurality of signal cycles different from the first plurality of signals. The pluralities of signal cycles sequentially produced by the modulator 20 to represent the pattern of binary 1's and binary 0's identifying the object are introduced to the dipole 16 for transmission to the antenna 12 at the reader.

The antenna 12 introduces the received signals to a mixer 26 for comparison in the mixer with the interrogating rf signals from the source 10. The mixed signals are introduced to an amplifier 28 and are demodulated in a demodulator 30. The demodulator produces signals in a sequence having a pattern identifying the pattern of 1's and 0's in the read-only memory 22 at the transponder. This sequence may be compared in the reader with a desired sequence to determine whether the object being identified is one being sought by the reader.

The system described above represents the prior art on a simplified basis. Such a system is disclosed in U.S. Pat. No. 4,075,632 issued on Feb. 21, 1978, to Howard A. Baldwin, Stephen W. Depp, Alfred R. Koelle and Robert W. Freyman and assigned of record to the United States of America as represented by the United States Department of Energy. Applicant's assignee of record in this application has obtained rights from the United States Government under U.S. Pat. No. 4,075,632 to make, have made, use and sell the invention disclosed in such patent and covered by the claims of such patent.

This invention provides an improvement on the system disclosed and claimed in U.S. Pat. No. 4,075,632. The assignee of record of this patent application has advanced the system of U.S. Pat. No. 4,075,632 in accordance with the improvements disclosed and claimed in this patent application.

The system of this invention employs a reader, generally indicated at 24, which is shown in detail in FIGS. 2a, 2b, 2c and 2d and which may be considered to be similar in some details to that shown in FIG. 1 and described above. The signals are transmitted by the dipole 16 in FIG. 1 to an antenna 26 (FIG. 2a) and are introduced to mixers 32 and 34. The interrogating rf signals from a source 30 (corresponding to the source 10 in FIG. 1) are also introduced to the mixer 32 and are shifted in phase by 90° as at 36 and are then introduced to the mixer 34. The signals from the mixers 32 and 34 are respectively amplified linearly at 40 and 42 and are then introduced to a mixer or third channel combiner 44. The signals from the amplifiers 40 and 42 and from the mixer 44 are respectively introduced to amplifiers 46, 48 and 50, each of which provides a high gain and then a limitation in amplitude after providing such high gain.

The signals from the limiting amplifiers 46, 48 and 50 respectively pass to shift registers (FIGS. 2b) 54 and 56 in series, 58 and 60 in series and 62 and 64 in series. The signals at mid points in the shift registers 54, 58 and 62 respectively pass to exclusive OR gates 66, 68 and 70. Signals are also respectively introduced to the input terminals of the exclusive OR gates 66, 68 and 70 from the output terminals of the limiting amplifiers 46, 48 and 50.

Figure 2C:
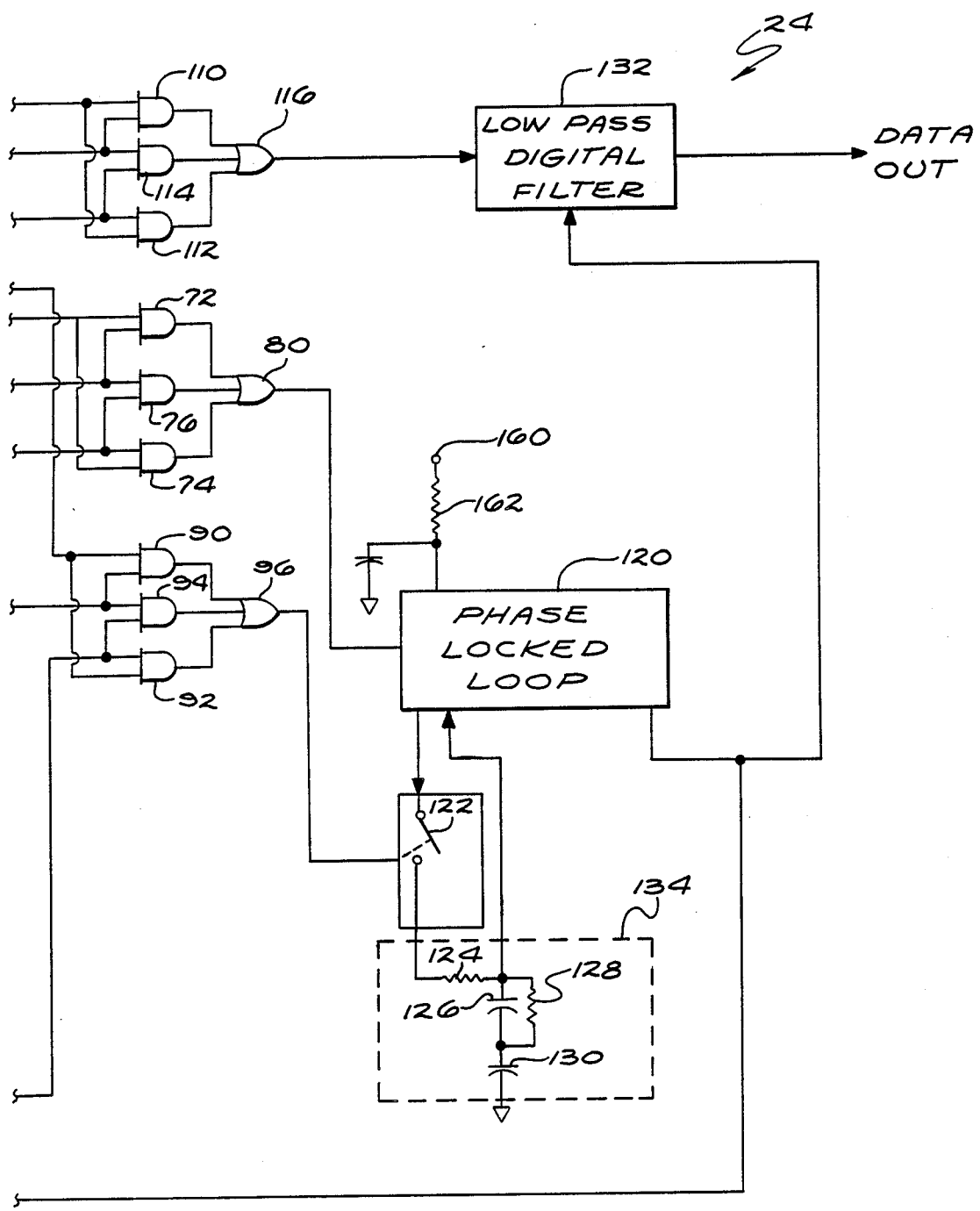

Connections are made from the output terminal of the exclusive OR gate 66 to input terminals of AND gates 72 and 74, from the output terminal of the OR gate 68 to input terminals of the AND gate 72 and an AND gate 76 and from the output terminal of the OR gate 70 to input terminals of the AND gates 74 and 76. The output terminals of the AND gates 72, 74 and 76 are connected to input terminals of an OR gate 80. (FIG. 2c). The AND gates 72, 74 and 76 are shown in FIGS. 2b and 2c.

In like manner, the signals from the limiting amplifiers 46, 48 and 50 (FIG. 2b) are respectively introduced to exclusive OR gates 82, 84 and 86. Second input terminals of the exclusive OR gates 82, 84 and 86 respectively receive signals from the output terminals of the shift registers 54, 58 and 62. Signals are introduced from the output terminal of the exclusive OR gate 82 to input terminals of AND gates 90 and 92, from the output terminal of the exclusive OR gate 84 to input terminals of the AND gate 90 and an AND gate 94 and from the output terminal of the exclusive OR gate 86 to input terminals of the AND gates 92 and 94. The output terminals of the AND gates 90, 92 and 94 are connected to input terminals of an OR gate 96. (FIG. 2c). The AND gates 90, 92 and 94 are shown in FIGS. 2b and 2c.

Correspondingly, the output terminals of the shift registers 56, 60 and 64 (FIG. 2b) respectively pass to input terminals of exclusive OR gates 100, 102 and 104. The exclusive OR gates 100, 102 and 104 also have input terminals respectively connected to the output terminals of the limiting amplifiers 46, 48 and 50. Connections are respectively made from the output terminals of the exclusive OR gates 100, 102 and 104 to input terminals of AND gates 110 and 112, input terminals of the AND gate 110 and an AND gate 114 and input terminals of the AND gates 112 and 114. The signals passing through the AND gates 110, 112 and 114 are introduced to input terminals of an OR gate 116. (FIG. 2c). The AND gates 110, 112 and 114 are shown in FIGS. 2b and 2c.

The signals from the OR gate 80 pass to a phase-locked loop 120 which may be constructed in a conventional manner. The phase-locked loop may include a phase detector and a voltage-controlled oscillator. An output terminal of the phase detector of the phase-locked loop 120 is connected to a movable arm of a switch 122, the positioning of which may be controlled by the signal from the OR gate 96. This is indicated by broken lines in FIG. 2c. The switch 122 is shown as a mechanically operated switch but it preferably constitutes a semi conductor device.

The stationary contact of the switch 122 is connected to a resistance 124 in series with a parallel combination of a capacitance 126 and a resistance 128. The parallel combination of the capacitance 126 and the resistance 128 is connected through a capacitance 130 to a reference potential such as ground. The terminal common to the resistances 124 and 126 and the capacitance 128 is connected to an input terminal of the voltage-controlled oscillator in the phase-locked loop 120. The resistances 124 and 128 and the capacitances 126 and 130 may be considered to be included in a low pass loop filter indicated in broken lines at 134 in FIG. 2c. The signals from the voltage-controlled oscillator of the phase-locked loop 120 are introduced to the clock terminal of a low-pass digital filter 132.

Figure 3:
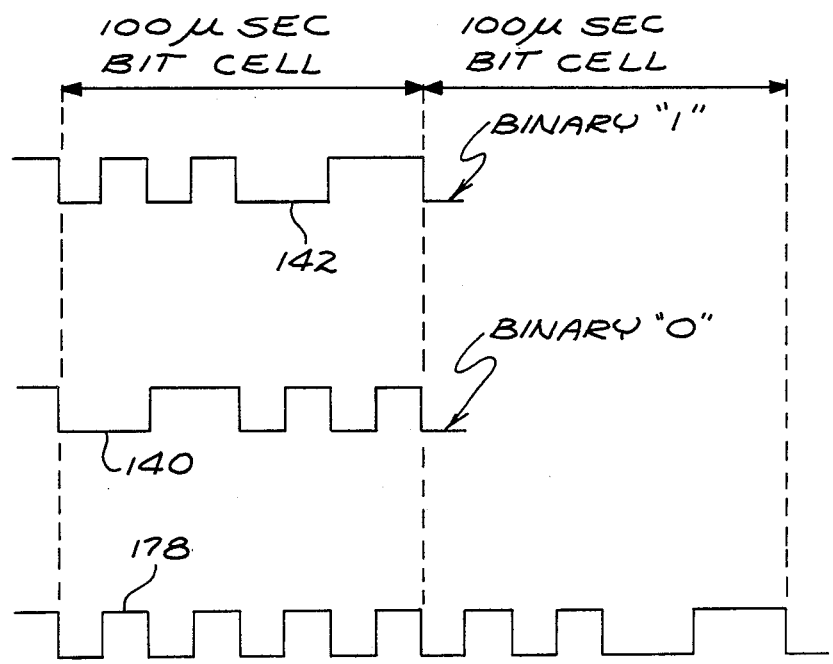
FIG. 3 illustrates waveforms produced in the transponder and detected at the reader to identify a binary "1", a binary "0" and a code indicating the end of the generation at the transponder of sequences of signal cycles in the pattern of binary 1's and binary 0's identifying the object.

When the dipole 16 at the transponder 18 in FIG. 1 receives the interrogating rf signals from the reader 24, it generates pluralities of signal cycles in a code dependent upon the pattern of 1's and 0's provided in the data source such as the read-only memory 22 to identify the object associated with the transponder. For example, a binary "0" may be represented by a first signal cycle at a suitable frequency such as twenty kilohertz (20 kHz) and then by additional signal cycles at a suitable frequency which is a harmonic of the first frequency. Preferably, the second frequency is forty kilohertz (40 kHz) when the first frequency is twenty kilohertz (20 kHz). This is illustrated at 140 in FIG. 3. Similarly, a binary "1" may be represented by two (2) cycles at the second frequency such as forty kilohertz (40 kHz) and then by an additional cycle at the first frequency such as twenty kilohertz (20 kHz). This is illustrated at 142 in FIG. 3.

The read-only memory 22 causes the modulator 20 to produce the pluralities of signal cycles respectively coding for the sequences of binary 1's and binary 0's in the individual pattern. The modulator 20 introduces these signals to the dipole 16 (FIG. 1) for transmission to the reader 24. These signals are received by the antenna 26 (FIG. 2a) and are introduced to the mixers 32 and 34 (FIG. 2a). The mixer 32 also receives the interrogating rf signals from the source 30 and the mixer 34 receives the interrogating rf signals from the source 30 after the signals have been shifted in phase by 90° by the stage 36. The mixed signals from the mixers 32 and 34 respectively pass through the amplifiers 40 and 42 to the limiting amplifiers 46 and 50. The signals from the amplifiers 40 and 42 are also mixed in the stage 44 and these mixed signals are introduced to the limiting amplifier 48.

If only one mixer such as the mixer 32 were used, the output from the mixer could disappear or become null if the received signal happened to be in quadrature phase (90° or 270°) with respect to the interrogating rf signal. By providing the mixers 32 and 34 and by providing a 90° shift in phase in the interrogating signal introduced to the mixer 34, a null cannot simultaneously occur at both of the mixers. As a result, an output signal will pass from at least one of the mixers under all of the different phase relationships possible between the received signal and the interrogating rf signal.

There is still one possibility of a null in the output. This may occur when the outputs of the mixers 32 and 34 have opposite polarities. That is, the output of one of the mixers 32 and 34 may be the inverse of the output of the other mixer. To prevent a null from occurring under such circumstances, the combiner 44 is included to combine the outputs of the signals from the linear amplifiers 40 and 42. The signals from the combiner 44 are introduced to the limiting amplifier 48. Since outputs are obtained from the three limiting amplifiers and since the outputs of these amplifiers are paired (e.g., in the AND gates 72, 74 and 76), an output is obtained from at least two (2) of these three (3) AND networks under all possible circumstances.

The shift registers 54 and 56 (FIG. 2b) delay the signals from the amplifier 46. The delay provided by the shift register 54 corresponds to one-half of the period of a signal cycle at the second frequency such as forty kilohertz (40 kHz). This signal cycle is introduced to the exclusive OR network 82. (FIG. 2b). Similarly, the exclusive OR network 66 receives from the shift register 54 the signal cycles delayed by a quarter of the period of a signal at the second frequency such as forty kilohertz (40 kHz). The shift register 56 provides the same delay as the shift register 54 so that the signal cycle introduced to the exclusive OR network 100 has a phase shift corresponding to a complete period of a signal cycle at the second frequency such as forty kilohertz (40 kHz). The exclusive OR networks 68, 84 and 102 receive signal cycles respectively delayed by the same time period as the signal cycles received by the exclusive OR networks 66, 82 and 100. This same phase relationship is also present in the signal cycles introduced to the exclusive OR networks 70, 86 and 104.

The exclusive OR gate 68 compares the amplitude of the signal cycles from the amplifier 48 with the amplitude of the delayed signal cycles from the shift register 54. When the amplitudes of the signal cycles are both simultaneously high or are both simultaneously low, the exclusive OR gate 66 produces a signal with a high amplitude. At all other times, the signals from the exclusive OR gate 66 have a low amplitude. The exclusive OR gates 68 and 70 respectively provide a similar comparison of the signal cycles from the amplifier 48 and the delayed signals from the shift register 58 and with the signal cycles from the amplifier 50 and the delayed signals from the shift register 62. The signals passing through the exclusive OR gates 66, 68 and 70 are introduced in individually paired relationships to the AND gates 72, 74 and 76 (FIGS. 2b and 2c). The AND gates 72, 74 and 76 in turn pass signals to the OR gate 80 which operates to provide an output signal when it simultaneously receives signals of high amplitudes from two of the AND gates 72, 74 and 76.

Figure 5:
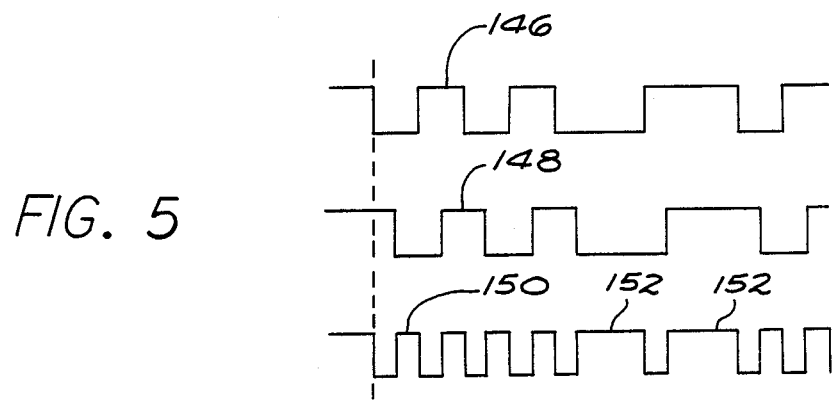
FIG. 5 illustrates waveforms of signal cycles generated at the reader to produce phase-locked signals used at the reader to provide clock signals for synchronizing the operation of the reader shown in FIGS. 2a, 2b, 2c and 2d.

In effect, the exclusive OR gates 66, 68 and 70 and the AND gates 72, 74, 76 and 80 operate to provide a comparison of the amplitudes of the received signal cycles and the received signal cycles delayed by one quarter of a time period of a signal cycle at the second frequency such as forty kilohertz (40 kHz). This comparison is indicated in FIG. 5. In FIG. 5, the received signal cycles are indicated at 146 and the delayed signal cycles are indicated at 148. The output from the OR gate 80 is indicated at 150 in FIG. 5. This output has a frequency which constitutes the fourth harmonic (e.g. 80 kHz) of the first frequency such as twenty kilohertz (20 kHz). The signals 150 occur in most cycles at the third frequency (e.g. 80 kHz) but, as will be seen at 152, do not occur in all cycles. The signals 150 have a high amplitude when the amplitudes of the signal cycles 146 and 148 are simultaneously high or simultaneously low.

Figure 6:
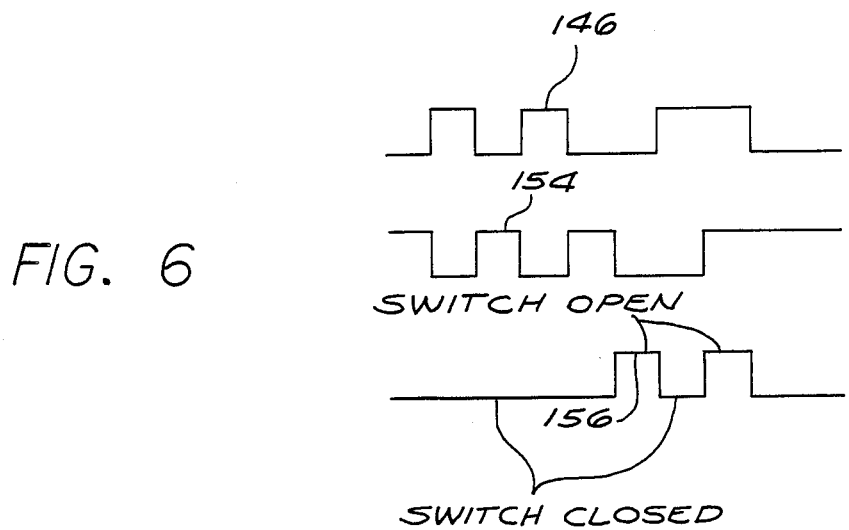
FIG. 6 illustrates waveforms of additional signals generated at the reader to produce additional phase-locked signals for providing the clock signals.

The exclusive OR gates 82, 84 and 86 respectively compare the amplitudes of the signals from the limiting amplifiers 46, 48 and 50 with the amplitudes of the output signals from the shift registers 54, 58 and 62. This comparison is indicated in FIG. 6. As will be seen in FIG. 6, the signal cycles from the amplifiers 46, 58 and 50 are indicated at 146 and the signal cycles from the phase shifters 54, 58 and 62 are indicated at 154. As a result of the comparison, signals are produced as indicated at 156 in FIG. 6. The signals 156 have a high amplitude when both the signals 144 and 154 simultaneously have a low amplitude or simultaneously have a high amplitude. The signals 156 are produced at the third frequency (e.g. 80 kHz) at the times that the signals 150 in FIG. 6 are not produced at this frequency. As a result, when the signals 150 and 156 are combined, the combination occurs at a periodic rate corresponding to the third frequency such as eighty kilohertz (80 kHz).

The signals 150 passing through the OR gate 80 (FIG. 2c) are introduced to the phase detector of the phase-locked loop 120 in FIG. 2c to obtain the production by the oscillator of signals at a particular frequency. For example, this frequency may be 1.28 megahertz. As will be appreciated, a frequency of 1.28 megahertz is a harmonic of the first frequency of twenty kilohertz (20 Hz) and the second frequency of forty kilohertz (40 kHz) and is also a harmonic of the phase-locked signals at the third frequency of eighty kilohertz (80 kHz) from the OR gate 80 and 96. As a result, the signals from the OR gate 80 and 96 constitute phase-locked signals to obtain the generation by the voltage-controlled oscillator in the phase-locked loop 120 of the clock signals at the frequency of 1.28 megahertz.

During the time that the phase-locked signals pass through the OR gate 80, the switch 122 (FIG. 2c) remains closed. This causes current to flow through a circuit including a voltage source 160, a resistance 162, the voltage-controlled oscillator in the phase-locked loop 120, the switch 122, the resistance 124, the resistance 128 and the capacitance 126 in parallel and the capacitance 130. This current charges the capacitance 126. This current is also instrumental in obtaining the generation by the voltage-controlled oscillator in the phase-locked loop 120 of the signals at the clock frequency of 1.28 megahertz.

When a signal passes through the OR gate 96 (FIG. 2c), it causes the switch 122 to open. The capacitances 126 and 130 then hold the input into the voltage-controlled oscillator in the phase-locked loop 120 and cause the voltage-controlled oscillator to continue maintaining the generation of the clock signals by the voltage-controlled oscillator at the frequency of 1.28 megahertz. In this way, the signals from the OR gates 80 and 96 are instrumental in obtaining the generation by the voltage-controlled oscillator in the phase-locked loop 120 of the clock signals at the frequency of 1.28 megahertz on a consistent basis.

Figure 4:
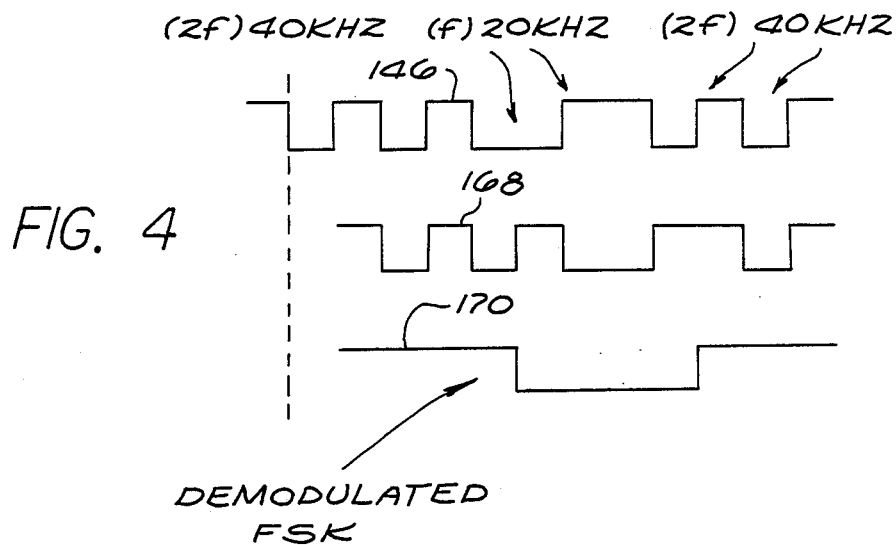
FIG. 4 illustrates waveforms of signal cycles generated at the reader to detect the sequence of binary 1's and binary 0's identifying the object.

The clock signals at the frequency of 1.28 megahertz from the voltage-controlled oscillator in the phase-locked loop 120 are introduced to the low pass digital filter 132. The filter 132 also receives the signals passing through the OR gate 116. The operation of the OR gate 116 may be seen from FIG. 4. In FIG. 4, the received signal cycles are indicated at 146 and the delayed signal cycles (delayed by one full cycle at 40 KHz); from the shift registers 56, 60 and 64 are indicated at 168. The results of the comparison between the signal cycles are indicated at 170. The signal cycles 170 represent the demodulated signals identifying the object associated with the transponder 18. The filter 132 filters the demodulated signals 170 to pass only the low frequencies represented by the demodulated signals and to prevent the passage of short pulses representing noise.

Figure 2D:
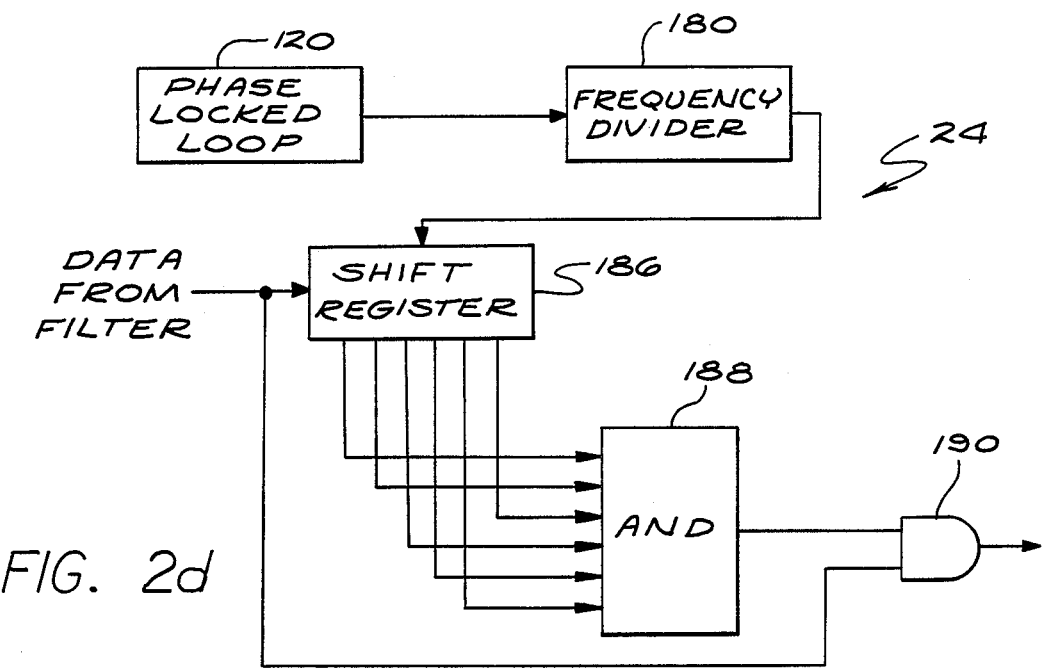

FIG. 2d illustrates on a somewhat simplified schematic basis a system for utilizing a sequence of signals 178 (FIG. 3) coding for the end of the sequence of binary 1's and binary 0's identifying the object associated with the transponder 18 and also coding for the beginning of the next such sequence. The system shown in FIG. 2d includes the voltage-controlled oscillator in the phase-locked loop 120 and a frequency divider 180. The frequency divider 180 receives the signals from the voltage-controlled oscillator 120 and divides these signals to produce clock signals at the second frequency such as forty kilohertz (40 kHz). These signals are introduced to a terminal of a shift register 186, another input terminal of which is connected to receive the demodulated signals 170. (FIG. 4).

The shift register 186 has six output terminals each of which is connected to the shift register to produce an output upon a successive occurrence of one of the signals from the frequency divider 180. When the six output terminals from the shift register 186 simultaneously have signals of high amplitude, a signal passes through an AND gate 188. This signal indicates that the transmission of the pluralities of signal cycles from the transponder 18 to identify the associated object has been completed and that a new sequence of such transmission is being initiated. The signal from the AND gate 188 is introduced to an AND gate 190, another terminal of the AND gate being connected to receive the demodulated signals 170. The output from the AND gate 190 accordingly synchronizes the start of a new transmission of the pluralities of signal cycles identifying the object.

The signals 178 have certain important advantages when used to indicate the end of a sequence of information signals identifying the object associated with the transponder 18 and the start of the next such sequence. One advantage is that the sequence 178 is different from any combination of signals identifying successive values of binary 1's and binary 0's. Another advantage is that the sequence 178 occurs in only a minimal amount of time. For example, the sequence 178 occurs in a period of time corresponding to the transmission of two binary 1's or two binary 0's. The sequence 178 is further advantageous in that it requires the same period of time as the generation of two binary 1's or two binary 0's.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. In combination in a system including a reader and a transponder displaced from the reader for identifying an object associated with the transponder, means at the reader for transmitting interrogating signals at a particular frequency to the transponder, means disposed at the transponder and responsive to the interrogating signals for generating successive pluralities of signal cycles in a pattern individual to the object, the signal cycles in each plurality including signal cycles at both first and second frequencies in a pattern representative of a binary "1" or a binary "0", means disposed at the transponder for transmitting the successive pluralities of signal cycles at the first and second frequencies to the reader, and means at the reader for decoding the pattern of the frequencies of the signal cycles in each of the successive pluralities to identify the object.

2. In a combination as set forth in claim 1,
the generating means including means providing initially at least one signal cycle at the first frequency and subsequently a signal cycle at the second frequency in individual ones of the pluralities to represent a binary "1" and providing initially at least one signal cycle at the second frequency and subsequently at least one signal cycle at the first frequency in other ones of the pluralities to represent a binary "0".

3. In combination as set forth in claim 1,
the first frequency being a harmonic of the second frequency,
the generating means including means providing initially a particular number of signal cycles at the second frequency and subsequently a signal cycle at the second frequency in individual ones of the pluralities to represent a binary "1" and providing initially at least one signal cycle at the first frequency and subsequently the particular number of signal cycles at the second frequency in other ones of the pluralities to represent a binary "1", the particular number of signal cycles at the first frequencies in each plurality being dependent upon the harmonic relationship between the first and second frequencies.

4. In a combination as set forth in claim 3,
the generating means generating signals of the same time duration to represent a binary "0" as to represent a binary "1".

5. In combination in a system including a reader and a transponder displaced from the reader for identifying an object associated with the transponder,
means at the reader for transmitting interrogating signals at a particular frequency to the transponder,
means disposed at the transpnder and responsive to the interrogating signals for generating successive pluralities of signals cycles in a pattern individual to the object, the signal cycles in each plurality including one signal cycle at a first frequency and two signal cycles at a second frequency constituting the second harmonic of the first frequency, the signal cycles at the second frequency preceding the signal cycle at the first frequency in each plurality representatitve of a binary "1" and the signal cycles at the first frequency preceding the signal cycle at the second frequency for each plurality representing a binary "0",
means at the transponder for transmitting the successive pluralities of signal cycles at the first and second frequencies to the reader, and
means at the reader for decoding the pattern of the frequencies of the signal cycles in each of the successive pluralities to identify the object.

6. In a combination as set forth in claim 5,
means at the transponder for generating an individual pattern of signal cycles at the first and second frequencies to identify the end of the successive pluralities of signal cycles generated at the first and second frequencies and identifying the object, and
means at the reader for decoding the individual pattern of the signal cycles at the cycles at the first and second frequencies to identify the end of the successive pluralities of signal cycles generated at the first and second frequencies and idnetifying the object.

7. In a combination as set forth in claim 5,
means at the transponder for generating, at the end of the successive pluralities of signals at the first and second frequencies, a sequence of signal cycles having a greater number of successive signal cycles at the second frequency than that represented by any combination of signal cycles coding for sequential 1's and 0's in the successive pluralities, and
means at the reader for decoding the sequence of signal cycles to identify the end of the successive pluralities of signal cycles at the first and second frequencies.

8. In a combination as set forth in claim 6,
the generating means including means for generating the sequence comprising six signal cycles at the second frequency and one signal cycle at the first frequency to identify the end of the successive pluralities of signal cycles at the first and second frequencies and the start of another such generation of such successive pluralities.

9. In a combination as recited in claim 6,
the means for generating the pattern of the signals to identify the end of the successive pluralities of signal cycles including means for generating the signals at the first and second frequencies in an individual pattern different from a binary "1" or a binary "0" or any combination of a binary "1" or a binary "0" and occurring in a time period constituting an integral multiple of the time period for generating the signals representing a binary "1" or representing a binary "0".

10. In a combination as set forth in claim 9,
the generating means including means for generating six (6) successive signals at the second frequency and then one (1) signal at the first frequency to identify the end of the successive pluralities of signal cycles generated at the first and second frequencies and identifying the object.

11. In a combination as recited in claim 6,
means disposed at the reader and responsive to the decoding of the end of the successive pluralities of signal cycles generated at the first and second frequencies and identifying the object for generating the successive pluralities of signal cycles at the first and second frequencies to identify the object.

12. In combination in a system including a reader and a transponder displaced from the reader for identifying an object associated with the transponder,
means at the reader for interrogating the transponder,
means disposed at the transponder and responsive to the interrogation from the reader for generating successive pluralities of signal cycles in an individual pattern identifying the object, the signal cycles in each plurality having patterns of signal cycles at both first and second frequencies to identify a binary "1" or a binary "0",
means for transmitting the successive pluralities of signal cycles to the reader,
means at the reader for receiving the transmitted signal cycles,
means at the reader for delaying the successive pluralities of the received signal cycles by a first delay time,
first means at the reader for comparing the received signal cycles and the signal cycles delayed by the first delay time to obtain a demodulation of the information represented by the signal cycles in the successive pluralities, means at the reader for delaying the successive pluralities of the received signal cycles by a second delay time different from the first delay time, second means at the reader for comparing the received signal cycles and the signal cycles delayed by the second delay time to generate phase-locked signals, means responsive at the reader to the phase-locked signals for generating clock signal cycles at the reader to facilitate the decoding of the information represented by the signal cycles in the successive pluralities, means at the reader for delaying the successive pluralities of the received signal cycles by a third delay time different from the first and second delay times, third means at the reader for comparing the received signal cycles and the signal cycles delayed by the third delay time to generate control signals, and means responsive to the control signals for generating additional phase-locked signals at times synchronous with the pahse-locked signals generated by the second comparing means to facilitate the generation of the clock signal cycles on a periodic basis.

13. In a combination as set forth in claim 12, wherein the first delay means includes means for delaying the received signal cycles by a period of time corresponding to the time for the production of a signal cycle at the second frequency, the second delay means includes means for delaying the received signal cycles by a period corresponding to one fourth (¼) of the first delay time, and the the third delay means includes means for delaying the received signal cycles by a period corresponding to one half (½) of the first delay time.

14. In a combination as set forth in claim 13, switching means having first and second states of operation, means responsive to the control signal cycles from the third comparing means for obtaining a controlled operation of the switching means in the first and second states in accordance with the pattern of such control signal cycles, and the means for generating the additional phase-locked signal cycles includes means responsive to each operation of the switching means in the second state for generating the additional phase-locked signal cycles.

15. In combination in a reader for identifying an object associated with a transponder displaced from the reader wherein the transponder generates, in a particular pattern identifying the object, pluralities of signal cycles at first an second frequencies in a first sequence to identify a binary "0" and in a second sequence, different from the first sequence, to identify a binary "1" and transmits the pluralities of signal cycles in the particular pattern of the first and second sequences to the reader, first means for receiving the pluralities of signal cycles in the particular pattern of the first and second sequences, second means for comparing the received pluralities of signal cycles and the received pluralities of signal cycles delayed by a first time period to detect the information coded by the received pluralities of signal cycles, third means for comparing the received pluralities of signal cycles and the received pluralities of signal cycles delayed by a second time period different from the first time period to generate phase-locked signals, fourth means for comparing the received pluralities of signal cycles and the received pluralities of signal cycles delayed by a third time period different from the first and second time periods to generate additional phase-locked signal cycles at times different from the phase-locked signals generated by the third means, and fifth means responsive to the phase-locked locked signals generated by third and fourth means for synchronizing the detection of the information generated by the received pluralities of signals with the generation of the phase-locked signals and the additional phase-locked signals.

16. In a combination as set forth in claim 15, switching means having first and second states of operation, the fourth means including means for maintaining the switching means in the second state of operation, and means responsive to the operation of the switching means in the second state for generating the additional phase-locked signals, the third means being operative to generate the phase-locked signals when the switching means is in the first state.

17. In a combination as set forth in claim 16, the means for generating the additional phase-locked signals including a capacitance responsive to the operation of the switching means in the first state for becoming charged and responsive to the operation of the switching means in the second state for discharging to generate the additional phase-locked signals.

18. In a combination as set forth in claim 15, low pass digital filter means responsive to the demodulated signals for eliminating noise signals.

19. In combination in a reader for identifying an object associated with a transponder displaced from the reader wherein the transponder generates, in a particular pattern identifying the object, pluralities of signal cycles at first and second frequencies in a first sequence to identify a binary "0" and in a second sequence, different from the first sequence, to identify a binary "1" and transmits the signal cycles in the particular pattern of the first and second sequences to the reader, means for receiving signals in the particular pattern of the first and second sequences, means for delaying the signal cycles for a first particular time period related to the first and second frequencies, means for delaying the signal cycles for a second particular time period related to the first and second frequencies but different from the first particular time period, means for delaying the signal cycles for a third particular time period related to the first and second frequencies but different from the first and second particular time periods, means for comparing the received signal cycles and the signal cycles delayed by the first time period for generating phase-locked signals, means for comparing the received signals and the signals delayed by the second time period for generating additional phase lock signals at the times not generated by the first comparing means, means for comparing the received signal cycles and the signal cycles delayed by the third time period for generating demodulated signals, and means responsive to the demodulated signals and the phase-locked signal cycles and the additional phase-locked signal cycles for recovering the code identifying the object.

20. In a combination as set forth in claim 19, the first delaying means including means for providing a delay of one fourth (¼) of the period represented by one of the signal cycles at the second frequency, the second dealying means including means for providing a delay of one half (½) of such period, and the third delaying means including means for providing a delay of such period.

21. In a combination as set forth in claim 19, means for responding to the signal cycles at the first and second frequencies to indicate when the particular pattern of the first and second sequences has been completed.

22. In a combination as set forth in claim 20, the transponder generating a plurality of signal cycles in a third sequence of signal cycles at the first and second frequencies where the third sequence is different from any combination of the first and second sequences to identify an object, and means at the reader for responding to the third sequence of signal cycles to indicate when the particular pattern of the first and second sequences has been completed.

23. In combination in a system for identifying an object, means displaced from the object for transmitting interrogating signals to the object, means responsive at the object to the interrogating signals for generating signals in a first pattern of signals at first and second frequencies representative of a binary "1" and in a second pattern of signals at the first and second frequencies representative of a binary "0", the first frequency being a harmonic of the second frequency and the duration of the signals representing a binary "0" being the same as the duration of the signals representing a binary "1", means disposed at the object for transmitting the successive pluralities of signals at the first and second frequencies in representation of the binary "0's" and the binary "1's", means at the displaced position for receiving the transmitted signals, and means at the displaced position for decoding the received signals to identify the pattern of binary "0's" and binary "1's" represented by such signals.

24. In a combination as set forth in claim 23, the generating means including means for generating a greater number of signals at the first frequency than at the second frequency for each binary "1" and binary "0" by a ratio corresponding to the ratio of the first and second frequencies.

25. In a combination as set forth in claim 24, the first frequency being the second harmonic of the second frequency and the number of signals at the first frequency being twice as great as the number of signals at the second frequency.

26. In a combination asset forth in claim 25, the generating means generating two (2) signals at the first frequency and then one (1) signal at the second frequency to represent a binary "1" and generating one (1) signal at the second frequency and then two (2) signals at the first frequency to represent a binary "0".

27. In combination in a reader for identifying an object associated with a transponder displaced from the reader wherein the transponder generates, in a particular pattern identifying the object, pluralities of signal cycles at first and second frequencies in a first sequence to identify a binary "1" and in a second sequence, different from the first sequence, to identify a binary "0"

switching means having first and second states of operation and normally being operative in the first state, charge storage means, means responsive to the operation of the switching means in the first state for charging the charge storage means, means responsive to first particular patterns of the signals in the first and second states for generating phase-locked signals at a particular frequency, means responsive to second particular patterns of the signals in the first and second states for obtaining an operation of the switching means in the second state, means responsive to the operation of the switching means in the second state for obtaining a discharge of the charge storage means, and means responsive to the discharge of the charge storage means for obtaining the generation of additional phase-locked signals at the particular frequency.

28. In a combination as set forth in claim 27, means responsive to the phase-locked signals and the additional phase-locked signals and the pluralities of signals generated by the transponder for identifying the object associated with the transponder.

29. In a combination as set forth in claim 27, the means for generating the phase-locked signals including means responsive to the signals at the first and second frequencies in the particular pattern and responsive to such signals delayed by a first particular time for passing the phase-locked signals at each instant in accordance with the relative amplitudes at such instant of such signals and such delayed signals, the means for generating the additional phase-locked signals including means responsive to the signals at the first and second frequencies in the particular pattern and responsive to such signals delayed by a second particular time different from the first particular time for passing the additional phase-locked signals at each instant in accordance with the relative amplitudes at such instant of such signals and such delayed signals.

30. In a combination as set forth in claim 29, including, the first frequency being the second harmonic of the second frequency, means for delaying the signals at the first and second frquencies in the particular pattern by one-fourth of the time period of signals at the first frequency to provide the signals delayed by the first particular time, and means for delaying the signals at the first and second frequencies in the particular pattern by one half of the time period of the signals at the second frequency to provide the signals delayed by the second particular time.

* * * * *

(12) EX PARTE REEXAMINATION CERTIFICATE (5457th)
United States Patent
Koelle et al.

(10) Number: US 4,739,328 C1
(45) Certificate Issued: Jul. 25, 2006

(54) SYSTEM FOR IDENTIFYING PARTICULAR OBJECTS

(75) Inventors: Alfred R. Koelle, Los Alamos, NM (US); Jeremy A. Landt, Los Alamos, NM (US)

(73) Assignee: Harris Trust and Savings Bank, Chicago, IL (US)

Reexamination Request:
No. 90/007,017, Apr. 26, 2004

Reexamination Certificate for:
Patent No.: 4,739,328
Issued: Apr. 19, 1988
Appl. No.: 06/885,248
Filed: Jul. 14, 1986

(51) Int. Cl.
*G01S 13/74* (2006.01)

(52) U.S. Cl. ............................ 342/44; 342/51
(58) Field of Classification Search .......... 342/44, 342/51
See application file for complete search history.

(56) References Cited

PUBLICATIONS

Bobbett et al., "Passive Electronic Identification and Temperature Monitoring System", Los Alamos Scientific Laboratory Technical Report, LA–6812–PR (Jul. 1977).
Koelle et al., "Technical Aspects of Electronic Identification and Temperature Monitoring System Oct. 1, 1977–Sep. 30, 1978", Los Alamos Scientific Laboratory Technical Report, LA–7641–MS (Mar. 1979).
Landt et al., "The Los Alamos Scientific Laboratory Electronic Vehicle Identification System", Los Alamos Scientific Laboratory Technical Report, LA–7818–MS (May 1979).

*Primary Examiner*—Michael O'Neill

(57) ABSTRACT

A reader interrogates an object. The object has a tag with a data source such as a read-only memory (ROM) which produces an identifying sequence of binary 1's and 0's in an individual pattern and transmits these signals to the reader. Each "1" or "0" is converted to a plurality of signal cycles at first and second harmonic frequencies. For example, a "1" may be identified by two signal cycles at the second frequency (e.g. 40 kHz) and then one signal cycle at the first frequency (e.g. 20 kHz) and a "0" may be identified by a signal cycle at the first frequency and then two signal cycles at the second frequency. The transponder also produces a plurality of signal cycles in an individual code (different from any combination of "1's" and "0's") to indicate the end of the transmission of the signal cycles identifying the object and the start of another transmission. The reader receives the signal cycles identifying the object and delays these signal cycles by (a) a first time such as ¼ period of a cycle at the second frequency, (b) a second time such as ½ of such period and (c) a third time corresponding to such period. The reader compares the received signals and the first delayed signals to produce first phase-locked signals. The reader compares the received signals and the second delayed signals to produce additional phase-locked signals at the times that the first phase-locked signals are not produced. The reader then produces clock signals from the first and additional phase-locked signals. The reader produces information signals from a comparison of the received signals and the third delayed signals. The reader synchronizes the information signals with the lock signals to identify the object.

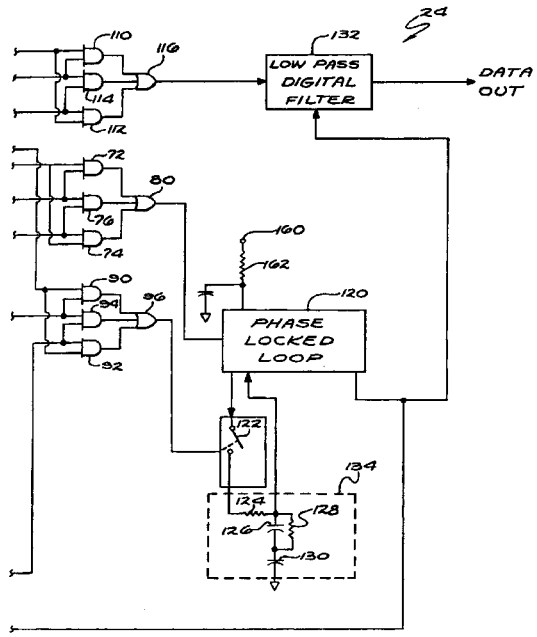

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–30 is confirmed.

* * * * *